(12) United States Patent
Fontoura et al.

(10) Patent No.: US 8,818,971 B1
(45) Date of Patent: Aug. 26, 2014

(54) PROCESSING BULK DELETIONS IN DISTRIBUTED DATABASES

(71) Applicant: Google Inc., Mountain View, CA (US)

(72) Inventors: Marcus Fontoura, Mountain View, CA (US); Jan Hendrik Pieper, San Jose, CA (US); Krishna Tatavarthi, Sunnyvale, CA (US); Bjoern Carlin, Zurich (CH); Hsiang-ling Lin, Sunnyvale, CA (US)

(73) Assignee: Google Inc., Mountain View, CA (US)

( * ) Notice: Subject to any disclaimer, the term of this patent is extended or adjusted under 35 U.S.C. 154(b) by 56 days.

(21) Appl. No.: 13/723,898

(22) Filed: Dec. 21, 2012

Related U.S. Application Data

(60) Provisional application No. 61/592,318, filed on Jan. 30, 2012.

(51) Int. Cl.
*G06F 17/30* (2006.01)
(52) U.S. Cl.
CPC .... *G06F 17/30117* (2013.01); *G06F 17/30283* (2013.01); *G06F 17/3002* (2013.01)
USPC ........... 707/696; 707/679; 707/711; 707/741; 707/742; 707/743; 707/744; 707/745; 707/746
(58) Field of Classification Search
CPC .......... G06F 17/30017; G06F 17/3002; G06F 17/30283
USPC .......... 707/673, 696, 711, 741–746
See application file for complete search history.

(56) References Cited

U.S. PATENT DOCUMENTS

| | | | |
|---|---|---|---|
| 7,567,959 B2 | 7/2009 | Patterson | |
| 7,743,379 B2 * | 6/2010 | Mathews et al. | 718/104 |
| 7,925,655 B1 | 4/2011 | Power et al. | |
| 8,224,861 B2 * | 7/2012 | Shinjo et al. | 707/796 |
| 2006/0288047 A1 * | 12/2006 | Chron et al. | 707/200 |
| 2009/0063400 A1 * | 3/2009 | Borkar et al. | 707/2 |
| 2012/0047188 A9 * | 2/2012 | Chron et al. | 707/813 |

\* cited by examiner

*Primary Examiner* — Frantz Coby
(74) *Attorney, Agent, or Firm* — Brake Hughes Bellermann LLP

(57) ABSTRACT

Systems and methods for deleting non-key values from an index distributed over a plurality of computing devices maintains a non-key master list that includes the non-key values that are stored on each of the plurality of computing devices and receives a list of non-key values to delete. The systems and methods further intersect the list of non-key values to delete with the non-key master list, creating a first delete list for a first one of the plurality of computing devices that includes non-key values to be deleted that are stored on the first computing device. The systems and methods further transmit the first delete list to the first computing device and update the non-key master list based on the list of non-key values to delete.

20 Claims, 6 Drawing Sheets

PROCESSING BULK DELETIONS IN DISTRIBUTED DATABASES

RELATED APPLICATIONS

This application claims priority under 35 U.S.C. §119 to Provisional Patent Application Ser. No. 61/592,318, entitled "SYSTEMS AND METHODS FOR PROCESSING BULK DELETIONS IN DISTRIBUTED DATABASES" filed on Jan. 30, 2012. The subject matter of this earlier filed application is hereby incorporated by reference.

BACKGROUND

With the advent of the Internet, search engines were created to assist users in locating information from among the millions of documents, mostly web pages, created and available through the use of the Internet. Due to the number of documents available for searching on the Internet, many search engines use distributed databases to store the search index. Distributed databases are used to store records in many different machines that do not share a common central processing unit. The search engines also often use an inverted index, or posting list, to locate documents responsive to a query. An inverted index is an index that maps content to locations (e.g., an index that stores a mapping of words to the location of documents that contain the words) rather than mapping the locations to content. For example, a library may contain many books and each book contains words. One way to digitize the library is to store the words in the books by book (a forward index), so that the words are grouped by book. Another way to digitize the library is to store the books by words (an inverted index) so that the books are grouped by words, similar to a concordance.

One difficulty in maintaining an inverted index (i.e., a posting list) occurs when a non-key value (e.g., the book) is removed from the index. The difficulty occurs because the entire index (every posting list) must be searched to find all occurrences of the non-key value. A large distributed database with frequent updates exacerbates this problem. For example, in a large distributed database a posting list for a term (e.g., a word or phrase) may be stored on many different machines, especially with common terms. The system may know what machines store each key value, for example each word, but the system does not know what non-key values, for example books, are stored on each machine.

Consequently, in a large distributed database, deleting non-key values from the inverted index consumes a large amount of resources. This occurs because the distributed database index knows where key values are stored, but does not know where each non-key value, such as a particular book, is stored without retrieving each posting list for each key value. Thus, for example, deleting a book from the library may result in the system sending a request to each machine in the distributed database to delete the book, if it exists, from any of the posting lists that the machine stores. While this approach may work for a fairly small static library, it is too slow and consumes too many resources for a large library with millions, or even billions, of deletions per day, as exists as for documents on the Internet.

SUMMARY

According to one general aspect, a computer-implemented method for deleting non-key values from an index distributed over a plurality of computing devices, the method includes maintaining, in a memory, a non-key master list that includes the non-key values that are stored on each of the plurality of computing devices and receiving a list of non-key values to delete. The method may also include intersecting the list of non-key values to delete with the non-key master list and creating a first delete list for a first one of the plurality of computing devices and a second delete list for a second one of the plurality of computing devices based on the intersecting, the first delete list including non-key values to be deleted that are stored on the first computing device and the second delete list including non-key values to be deleted that are stored on the second computing devices. The method may further include transmitting the first delete list to the first computing device and the second delete list to the second computing device and updating the non-key master list based on the list of non-key values to delete.

The method can include one or more of the following features. As one example, the list of non-key values to delete may include more than one million entries. As another example, the index may be a posting list and entries in the posting list may include a key value mapped to one or more non-key values. In such an implementation, the key values may be terms and the non-key values may be document identifiers, such that the posting list maps terms to document identifiers of documents that contain the term. Furthermore, the method may include the first computing device removes the non-key values on the first delete list from the portion of the index stored on the first computing device. As another example, maintaining the non-key master list may include updating the list as part of a rolling index maintenance process and/or the non-key master list may be distinct from a database index file.

According to yet another general aspect, a system may include a plurality of computing devices storing an index distributed over the plurality of computing devices and a central server in communication with the plurality of computing devices. The central server may store a non-key value master list that includes non-key values that are stored on each of the plurality of computing devices. The central server may be configured to perform operations including receiving a list of non-key values to delete, intersecting the list of non-key values to delete with the non-key master list, and creating a first delete list for a first one of the plurality of computing devices and a second delete list for a second one of the plurality of computing devices based on the intersecting. The first delete list may include non-key values to be deleted that are stored on the first computing device and the second delete list may include non-key values to be deleted that are stored on the second computing devices. The central server may further be configured to transmit the first delete list to the first computing device and the second delete list to the second computing device and update the non-key master list based on the list of non-key values to delete.

The system can also include one or more of the following features. For example, the index may include posting lists with entries that include a key value mapped to one or more non-key values. In such an implementation, the key values may be terms and the non-key values may be document identifiers, such that the posting list entries map terms to document identifiers of documents that contain the term and/or the first computing device may remove the non-key values on the first delete list from the posting lists stored on the first computing device. As another example, the non-key master list may be distinct from a database index file.

According to yet another aspect, a computer-implemented method for deleting non-key values from an inverted index in a database distributed over a plurality of computing devices may include maintaining, at each of the plurality of computing devices, a list of the non-key values that are stored on the computing device in a memory of the computing device and receiving, by a particular one of the plurality of computing devices, a list of non-key values to delete. The method may also include intersecting, by one or more processors of the computing device, the list of non-key values to delete with the list of the non-key values that are stored on the particular computing device and creating a delete list for the particular computing device based on the intersecting, the delete list including non-key values to be deleted that are stored on the particular computing device. The method may further include removing the non-key values on the delete list from the plurality of non-key values that are stored on the particular computing device.

In some implementations the method may also include updating the list of the non-key values that are stored on the particular computing device. In some implementations, the list of non-key values that are stored on each of the plurality of computing devices is distinct from a database index file. In some implementations, the index is a posting list with entries including a key value mapped to one or more non-key values. In such an implementation, the key values may be terms and the non-key values may be document identifiers, such that the posting list maps terms to document identifiers of documents that contain the term.

According to another aspect, a plurality of computing devices may store an index distributed over the plurality of computing devices. The computing devices may be configured to perform operations including receiving, by a particular one of the plurality of computing devices, a list of non-key values to delete and intersecting, by one or more processors of the particular computing device, the list of non-key values to delete with the list of the non-key values that are stored on the particular computing device. The computing devices may further be configured to create a delete list for the particular computing device based on the intersecting. The delete list may include non-key values to be deleted that are stored on the particular computing device. The computing devices may also be configured to remove the non-key values on the delete list from the non-key values that are stored on the particular computing device.

According to another general aspect, a tangible computer-readable storage medium may have recorded and embodied thereon instructions that cause a computer system to perform the any of the disclosed methods.

The details of one or more implementations are set forth in the accompanying drawings and the description below. Other features will be apparent from the description and drawings, and from the claims.

BRIEF DESCRIPTION OF THE DRAWINGS

Like reference symbols in the various drawings indicate like elements.

DETAILED DESCRIPTION

A system and method is disclosed for performing a bulk delete of non-key values from an inverted index stored over a distributed cluster of machines. The method includes creating a non-key master list containing the non-key values, for example documents, including web pages, stored on each machine in the cluster. This master list may be stored at an indexing server of the system. Because the master list is large and not used to respond to queries, it may be stored in slow memory, for example a disk. When the system determines what non-key values need to be deleted from the index by, for example, crawling the Internet for documents that have been updated, the delete list can be intersected with the non-key master list. The intersection may result in one or more machine-specific lists of the non-key values that should be deleted. The indexing server may transfer to each machine its machine-specific list of non-key values that need to be deleted. Creating machine-specific delete lists offers two advantages over sending the entire delete list to each machine. First, it allows each machine to receive a much smaller list of non-key values, for example documents or document identifiers, to process, decreasing the processing time and resources used on the machine. Second, it allows the indexing server to transmit smaller files to fewer machines, making the overall transfer time shorter and, therefore, further decreasing the processing time for the overall bulk deletion transaction.

In various implementations, a distributed indexing system may create the non-key master list as part of a rolling index maintenance process. For example, the distributed indexing system may refresh a portion of the index every N days. During the refresh of a particular portion, the distributed indexing system may perform other housekeeping tasks on that portion of the index by, for example, de-fragmenting the index, moving entries to faster-access or slower-access memory device as appropriate, etc.

Figure 1:
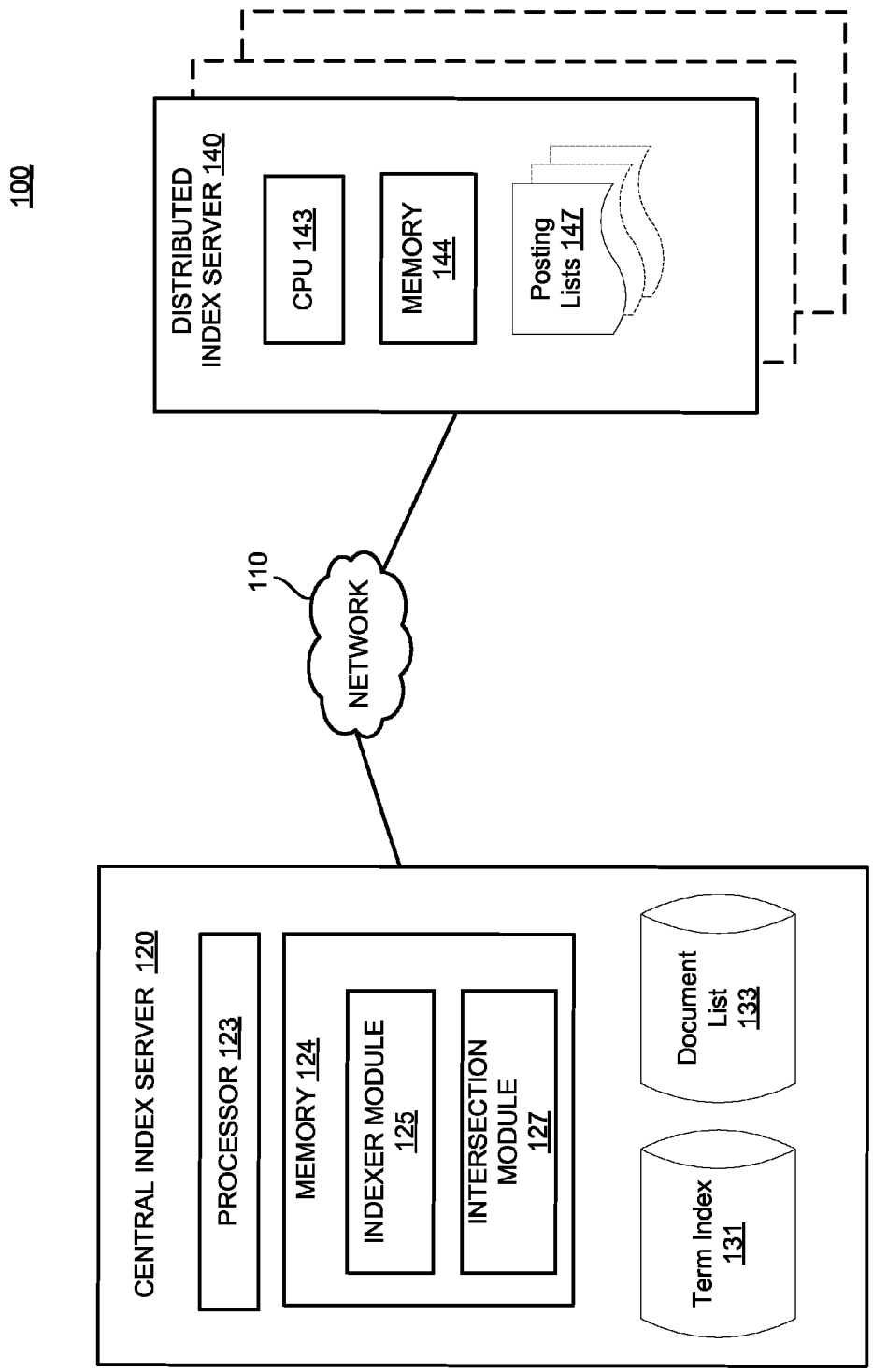
FIG. 1 illustrates an exemplary system in accordance with the disclosed subject matter.

FIG. 1 is a block diagram of a distributed indexing system 100 in accordance with an example implementation. The system 100 may be used to implement a distributed indexing system using the techniques described herein. The depiction of system 100 in FIG. 1 is shown as an Internet-based search engine with an inverted index having, by way of example, terms as key-values and document identifiers as non-key values. Documents may include any type of web-based content, including web pages, PDF documents, word-processing documents, images, sound files, JavaScript files, etc. But, it will be appreciated that other network configurations and index uses may be used for implementing such techniques and that an Internet-search engine is used for exemplary purposes.

Figure 5:
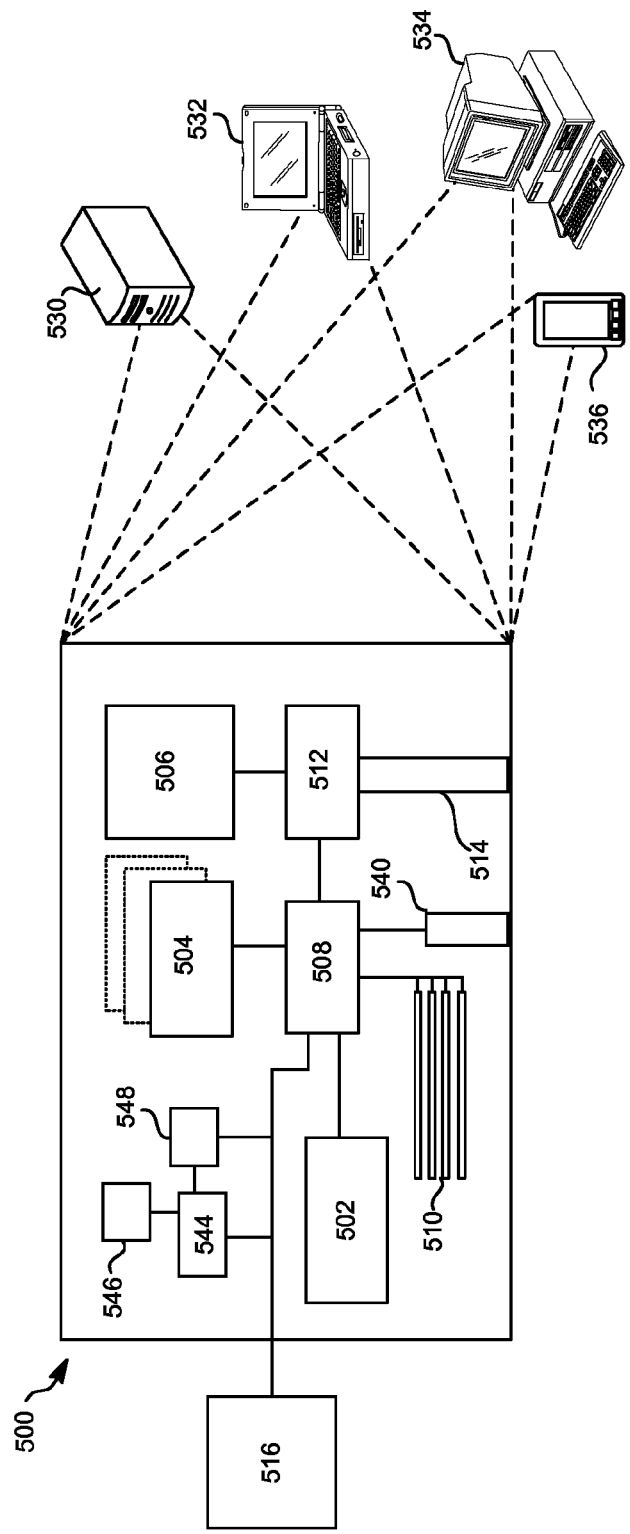
FIG. 5 shows an example of a computer device that can be used to implement the described techniques.
Figure 6:
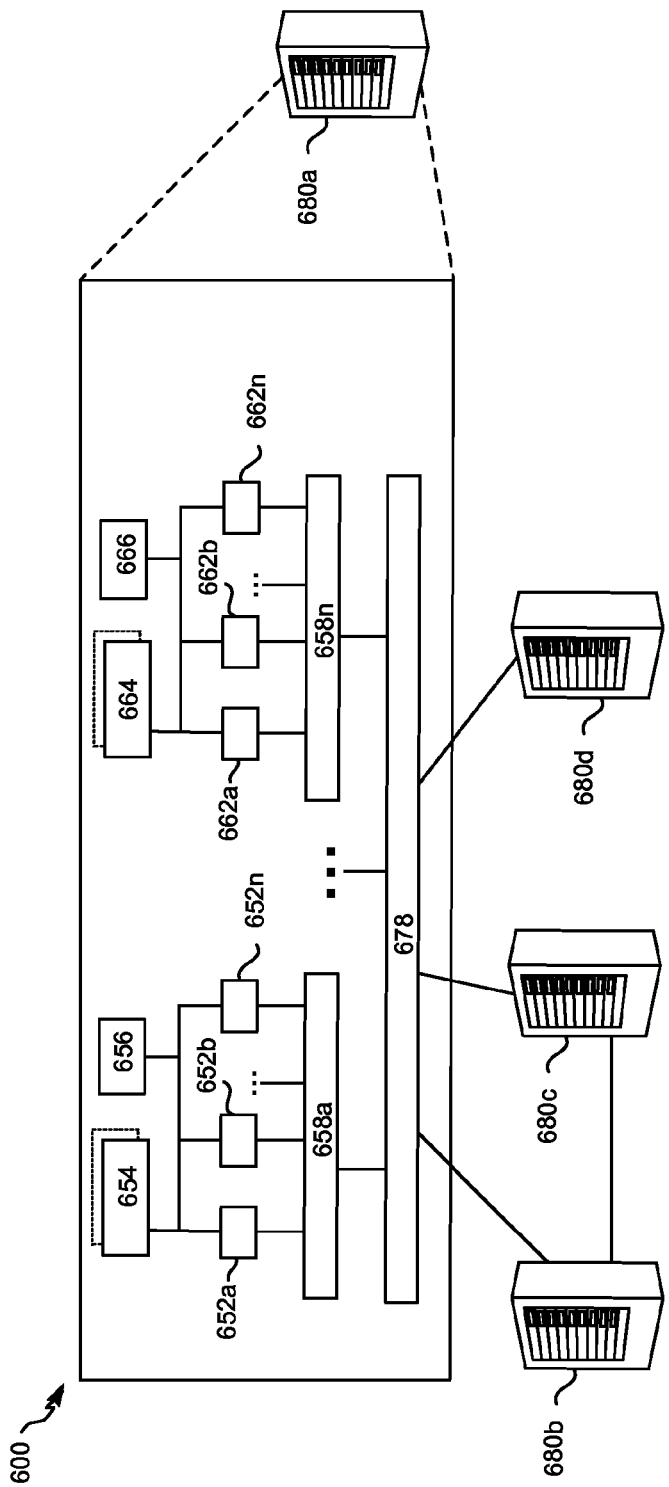
FIG. 6 shows an example of a distributed computer device that can be used to implement the described techniques.

The distributed indexing system 100 includes central index server 120 and a plurality of distributed index servers 140. Central index server 120 and distributed index servers 140 may be computing devices that take the form of a number of different devices, such as a standard server, a group of such servers, or a rack server system. In addition, servers 120 and 140 may be implemented in a personal computer, such as a laptop computer. The servers 120 and 140 may be examples of computer device 500, as depicted in FIG. 5, or computer device 600, as depicted in FIG. 6.

Central index server 120 can include one or more processors 123 configured to execute one or more machine executable instructions or pieces of software, firmware, or a combination thereof. The central index server 120 can include, an operating system (not shown) and one or more computer memories 124, such as a main memory, configured to store one or more pieces of data, either temporarily, permanently, semi-permanently, or a combination thereof. Memory 124 may include any type of storage device that stores information in a format that can be read and/or executed by processor 123. Memory 124 may include volatile memory, non-volatile memory, or a combination thereof, and store indexer module 125 and intersection module 127. In other implementations, indexer module 125 and intersection module 127 may be stored in an external storage device (not shown) and loaded into memory 124. The central index server 120 can also include one or more storage mediums to store term index 131 and document list 133, such as a computer-readable storage disk or cache, configured to store data in a semi-permanent or substantially permanent form.

In some implementations, the central index server 120 may include one or more other hardware components not shown in FIG. 1, such as for example, a display or monitor, a keyboard, a touchscreen, a camera, a mouse, a touchpad, a trackpad, a video processor, etc.

Indexer module 125 may contain instructions that cause the one or more processors 123 to perform certain operations, including the creation and maintenance of term index 131 and document list 133. Intersection module 127 may contain instructions that cause the one or more processors 123 to perform operations including the creation of one or more machine-specific delete lists.

System 100 may also include a plurality of distributed index servers 140, although only one distributed index server 140 is illustrated in FIG. 1 for the purpose of brevity. The plurality of distributed index servers 140 may form a cluster of computing devices over which the index is stored. Each distributed index server 140 can include one or more processors 143 configured to execute one or more machine executable instructions or pieces of software, firmware, or a combination thereof. The distributed index server 140 can include, an operating system (not shown) and one or more computer memories 144, such as a main memory, configured to store one or more pieces of data, either temporarily, permanently, semi-permanently, or a combination thereof. Memory 144 may include any type of storage device that stores information in a format that can be read and/or executed by processor 143, including volatile memory, non-volatile memory, or a combination thereof. The distributed index servers 140 can also include one or more posting lists 147 stored on a tangible computer-readable storage device, such as disk or cache, configured to store data in a semi-permanent or substantially permanent form.

In some implementations, the distributed index server 140 may include one or more other hardware components not shown in FIG. 1, such as for example, a display or monitor, a keyboard, a touchscreen, a camera, a mouse, a touchpad, a trackpad, a video processor, etc.

In some implementations, distributed indexing system 100 is an Internet-based search engine having an inverted index. As described in more detail below, an inverted index generally includes a plurality of posting lists, with each posting list comprised of a term and a list of document identifiers. In a distributed inverted index, the index entries, or the posting list entries, may be stored on several different machines, such as the distributed index servers 140. In such implementations, central index server 120 is communicatively coupled to a plurality of web servers (not shown) storing documents, such as web pages, PDF documents, word processing documents, etc. In such an implementation, central index server 120 can crawl the contents of the web servers to locate newly added content, such as documents, deleted content, and modified content. When central index server 120 identifies content, such as a document, that has been deleted or a content that has been modified, central index server 120 may create a list of the identified documents so that entries in the posting lists may be appropriately removed. It is to be understood that although mentioned as having documents, the posting lists may actually include identifiers for the documents and not the documents themselves. For example, when a document on the Internet is updated, because of the size of the inverted index and the total number of documents being updated on the Internet, it may be faster and more efficient to treat the update as a delete followed by an insert rather than to try and identify what terms changed in the document and modify only the posting lists associated with those terms. This way central index server 120 avoids having to compare the contents of each document to find out what changed. Instead, each reference to the document may be deleted from the index and new references may be inserted. Thus, in such an implementation, a document modification can be viewed as a type of document deletion that is followed by an insertion.

Distributed index servers 140 may be in communication with central index server 120 over network 110. For example, the network 110 can be wired or wireless and can include, a local area network (LAN), a wide area network (WAN), etc., implemented using, for example, gateway devices, bridges, switches, and/or so forth. The network 110 can include one or more segments and/or can have portions based on various protocols such as Internet Protocol (IP) and/or a proprietary protocol. For example, the network 110 may include a data access network that provides access to the Internet and/or the World Wide Web. Via the network 110, the central index server 120 and the plurality of distributed index servers 140 may communicate with and transmit data to each other.

Central index server 120 may include term index 131. Term index 131 may store a mapping of the index key values, such as terms, to the distributed index servers 140. For example, term index 131 may indicate which of distributed index servers 140 have a posting list 147 for a specific key value. In other words, term index 131 may indicate which of distributed index servers 140 store a posting list for the term "cat." Term index 131 may be used to determine which of distributed index servers 140 should be searched in response to a query. Central index server 120 may create term index 131 as part of an indexing process that, for example, crawls documents that have been updated or added to the Internet, or other such document corpus.

In addition, central index server 120 may include a non-key master list, such as document list 133. The non-key master list may store a mapping of non-key values, for example document identifiers, to the distributed index servers 140. Such a master list may enable central index server 120 to identify each distributed index server 140 where a document is stored. Rather than being an index used by a database system, a non-key master list, such as document list 133, may simply be a text file stored on central index server 120. In other words, document list 133 may not be used for responding to queries. Instead, document list 133 may be used, as explained in more detail below, to create machine-specific deletion lists through an intersection operation. Because document list 133 is not part of the inverted index of system 100, without document list 133 central index server 120 may not be able to determine what documents are associated with what distributed index servers 140.

Distributed index servers 140 may include posting lists 147. Posting lists 147 and term index 131 may, together, constitute a distributed inverted index. Posting lists 147 may include one or more entries for each key-value. For example, in an Internet search engine, posting lists 147 may include a term followed by the document identifiers of the documents stored on distributed index server 140 that include the term. A term may be a single word, a phrase that includes two or more words, or any metadata or other information that is attached to the document, such as anchors derived from Web links, features derived from machine learning models and/or language models.

Figure 2:
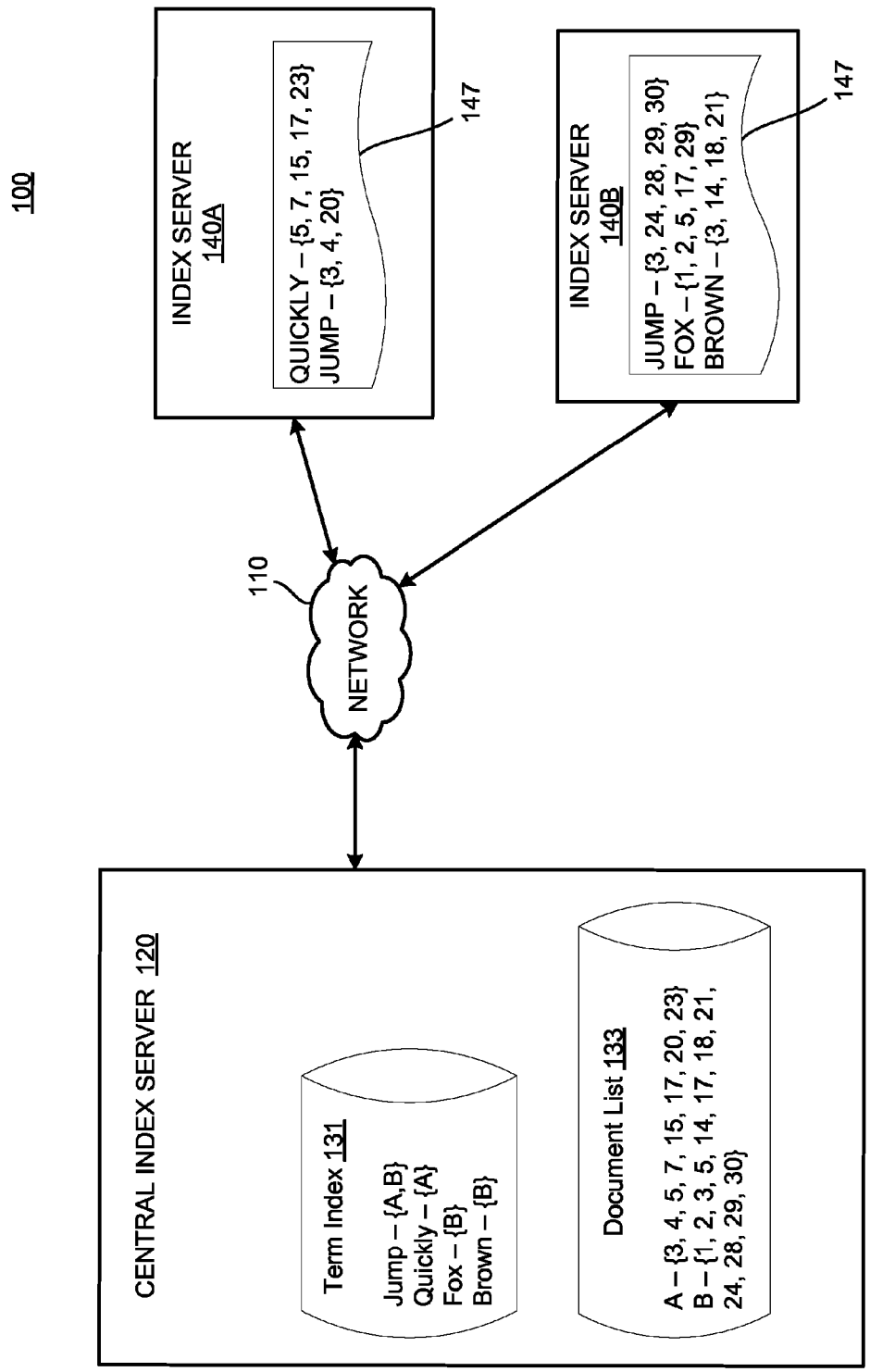
FIG. 2 illustrates an exemplary distributed index and non-key master list that can be used in accordance with the system of FIG. 1.

FIG. 2 illustrates an exemplary distributed index and non-key master list that can be used in accordance with the system of FIG. 1. For the purpose of brevity, FIG. 2 depicts two distributed index servers, 140A and 140B. Of course, many more distributed index servers, even hundreds, may be included in a distributed index system 100. In the example of FIG. 2, distributed index server 140A stores documents 3, 4, 5, 7, 15, 17, 20, and 23 and distributed index server 140B stores documents 1-3, 5, 14, 17, 18, 21, 24, 28, 29, and 30. As demonstrated in FIG. 2, a document, such as document 3, can be stored by more than one distributed index server 140, although it may be more common for a document to be stored on a single index server 140. In the example of FIG. 2, index server 140A contains two posting lists, one for the term "quickly" and the other for the term "jump." The posting list for "quickly" contains documents 5, 7, 15, 17, and 23. This indicates that documents 5, 7, 15, 17, and 23 contain the word "quickly" at least one time in the body of the document. Although not shown in FIG. 2, other information may be stored in the posting list along with each document identifier, such as ranking scores for the term/document pair.

FIG. 2 also demonstrates that index server 140B may contain posting lists for the terms "jump," "fox," and "brown." As shown in FIG. 2, a posting list for a single term may be stored on different machines, such as the lists for "jump." Term index 131 reflects that the posting lists for "jump" are stored on both index server 140A and index server 140B. FIG. 2 includes term index 131 for illustrative purposes and that term index 131 may not used in a bulk deletion process, but may be used to respond to queries. Thus, for example, term index 131 in FIG. 2 indicates that a query that includes the term "jump" would require access to both distributed index server 140A and 140B to return search results. Unlike term index 131, document list 133 of FIG. 2 is not intended for use as a query index. Instead, document list 133 may be used by a bulk deletion process, such as that shown in FIG. 3, to determine what index servers 140 contain references to a specific document.

Figure 3:
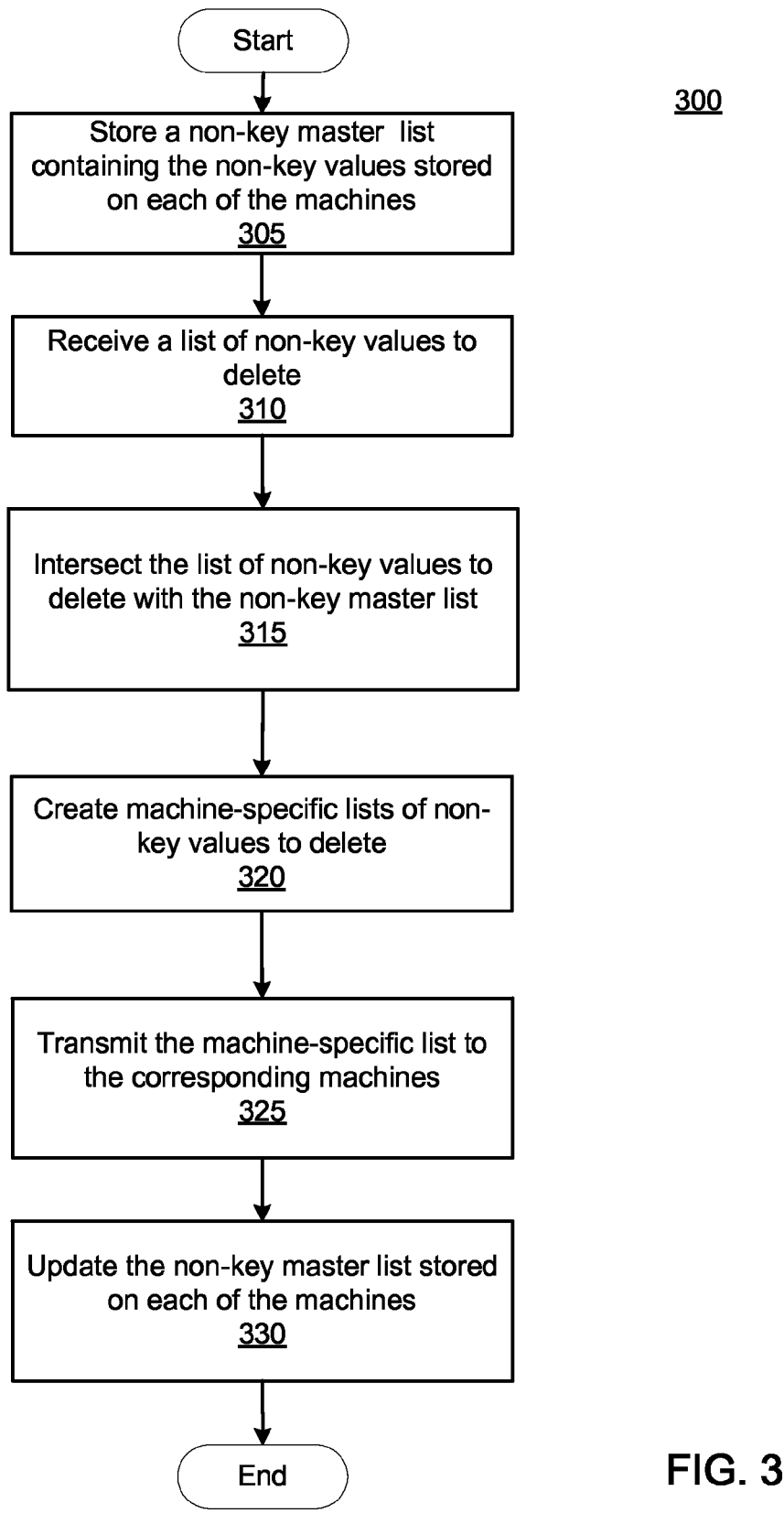
FIG. 3 illustrates a flow diagram of an exemplary process for performing a bulk delete of non-key values from a distributed index, consistent with disclosed embodiments.

FIG. 3 is a flow diagram of an exemplary process 300 for performing a bulk delete of non-key values in a distributed index. Process 300 shown in FIG. 3 may be performed at least in part by a central index server, such as server 120 shown in FIG. 1 and/or a plurality of distributed index servers, such as servers 140 shown FIG. 1. The central index server 120 may store the non-key master list, for example document list 133, that identifies which documents are stored on each distributed index server 140 (step 305). Central index server 120 may create the non-key master list as part of the index creation process or an index maintenance process. For example, when central index server 120 identifies a new document, it must decide which of distributed index servers 140 to store the document on. Having made the decision, central index server 120 may record the decision in, for example, document list 133. Similarly, when central index server 120 identifies a document that has changed, the central index server 120 may choose to move the document to a new index server 140, leave the document where it is currently stored, or store the document on two or more of distributed index servers 140. After making such a decision, the central index server 120 may record the decision in document list 133. As previously indicated, because the non-key master list is not an index, it may be stored in memory devices with slower access times, such as disk, and need not have any particular organization.

Central index server 120 may then receive a list of non-key values to delete (step 310). As explained above, such a list may come from a process that searches for modified documents in a document corpus, such as modified web pages on the Internet. Such a list may be referred to as a delete list. Central index server 120 may intersect the delete list with the non-key master list (step 315) to create machine-specific lists of non-key values, such as document identifiers, to delete (step 320). For example, using the system shown in FIG. 2, central index server 120 may determine that documents 5 and 29 have been modified and document 15 has been deleted. Thus, the delete list in this example contains a document identifier for documents 5, 15, and 29. Central index server 120 may intersect this delete list with the non-key master list, such as document list 133, resulting in two machine-specific delete lists. In the example of FIG. 2, the delete list for distributed index server 140A would contain documents 5 and 15 and the delete list for distributed index server 140B would contain documents 5 and 29.

Central index server 120 may then transmit the machine-specific delete lists to the appropriate machines (step 325). For example, central index server 120 may transmit the list including documents 5 and 15 to distributed index server 140A and the list containing documents 5 and 29 to distributed index server 140B. Thus, each distributed index server 140 receives a delete list that contains only entries for documents stored on the particular distributed index server 140. This reduces the processing that a distributed index server 140 must perform to locate and delete the references to the non-index values in its posting lists because the index server 140 is not looking for non-key values that do not exist in its posting lists. In addition, distributed index servers 140 that are not associated with any of the documents on the delete list do not have to perform any processing. For example, if central index server 120 discovers that only document 23 has changed, only distributed index server 140A will receive a machine-specific delete list and distributed index server 140B will not have to process a list. Furthermore, central index server 120 may send the smaller machine-specific delete lists to a number of distributed index servers 140 rather than having to send the entire delete list to each distributed index server 140. This reduces the transmission time, especially when a delete list contains millions of entries.

Central index server 120 may then update the non-key master list (step 330). For example, if document 15 has been deleted, central index server 120 may remove the reference to document 15 from the document list 133. Alternatively, if as a result of the change to document 23 central index server 120 has moved document 23 from distributed index server 140A to distributed index server 140B, such a change will be reflected in document list 133. Process 300 may then end, having processed the bulk deletion of non-key values from posting lists on the distributed index servers 140.

Figure 4:
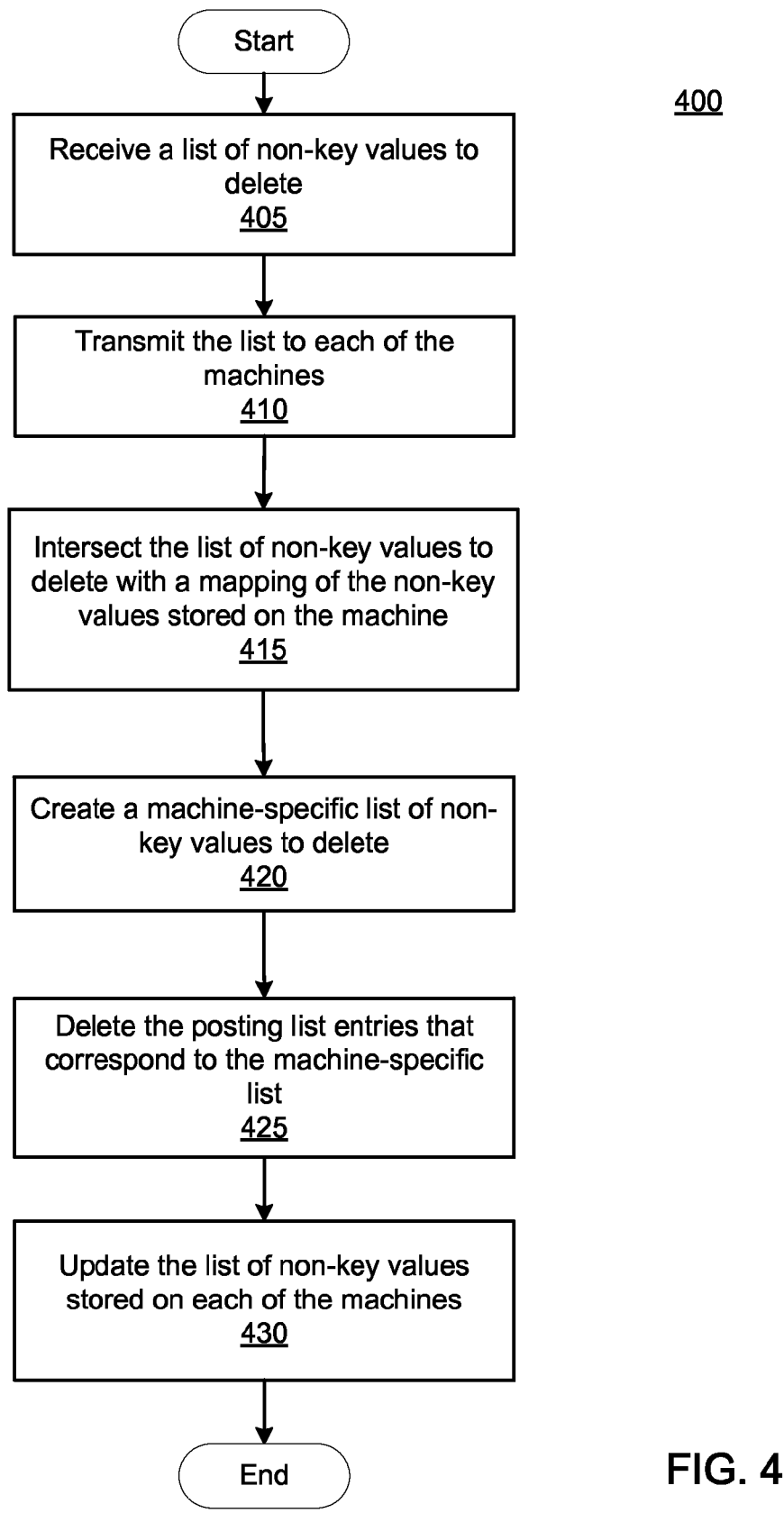
FIG. 4 illustrates a flow diagram of another exemplary process for performing a bulk delete of non-key values from a distributed index, consistent with disclosed embodiments.

FIG. 4 illustrates an alternative process 400 for performing a bulk delete of non-key values from a distributed index. System 100 may perform process 400 rather than process 300, although process 300 may be preferable for very large distributed indexes and non-key master lists having, for example, a million or more entries. In the example of FIG. 4, the distributed index servers 140, and not central index server 120, may store the non-key master list, for example document list 133. Each distributed index server 140 may maintain its own version of document list 133 and the versions may be unique. In other words, system 100 may have a document list 133A that contains only the document identifiers of documents stored on distributed index server 140A and a document list 133B that contains only the document identifiers of documents stored on distributed index server 140B. In other implementations, each distributed index server 140 may store the same version of document list 133A.

Like process 300, central index server 120 may receive a list of documents to be deleted (step 405). Central index server 120 may then transmit the delete list to each of the distributed index servers 140 (step 410). Each distributed index server 140 may intersect this delete list with its version of the non-key value master list (step 415), resulting in the creation of a machine-specific delete list containing documents that should be deleted from the distributed index server 140 (step 420). In implementations where distributed index server 140 maintains a unique version of the non-key master list, only one delete list may result from the intersection. In other implementations where the distributed index servers 140 store the same version of the non-key master list, several machine-specific delete lists may result from the intersection and each distributed index server 140 may choose only its machine-specific delete list. Each distributed index server 140 may then delete the entries on the delete list from its portion of the index, the portion being, for example, the posting lists 147. (step 425). The non-key value master list may then be updated based on the entries in each delete list (step 430). For example, if a document list 133 is shared by each distributed index server 140, central index server 120 may update the document list 133 and push an updated version to each distributed index server 140. In other implementations, each distributed index server 140 may update its own version of document list 133. When all non-key entries have been removed and the document list(s) 133 are updated, process 400 may end.

FIG. 5 shows an example of a generic computer device 500, which may be central index server 120 or distributed index server 140 of FIG. 1, which may be used with the techniques described here. Computing device 500 is intended to represent various example forms of computing devices, such as laptops, desktops, workstations, personal digital assistants, cellular telephones, smart phones, tablets, servers, and other computing devices, including wearable devices. The components shown here, their connections and relationships, and their functions, are meant to be examples only, and are not meant to limit implementations of the inventions described and/or claimed in this document.

Computing device 500 includes a processor 502, memory 504, a storage device 506, and expansion ports 510 connected via an interface 508. In some implementations, computing device 500 may include transceiver 546, communication interface 544, and a GPS (Global Positioning System) receiver module 548, among other components, connected via interface 508. Device 500 may communicate wirelessly through communication interface 544, which may include digital signal processing circuitry where necessary. Each of the components 502, 504, 506, 508, 510, 540, 544, 546, and 548 may be mounted on a common motherboard or in other manners as appropriate.

The processor 502 can process instructions for execution within the computing device 500, including instructions stored in the memory 504 or on the storage device 506 to display graphical information for a GUI on an external input/output device, such as display 516. Display 516 may be a monitor or a flat touchscreen display. In some implementations, multiple processors and/or multiple buses may be used, as appropriate, along with multiple memories and types of memory. Also, multiple computing devices 500 may be connected, with each device providing portions of the necessary operations (e.g., as a server bank, a group of blade servers, or a multi-processor system).

The memory 504 stores information within the computing device 500. In one implementation, the memory 504 is a volatile memory unit or units. In another implementation, the memory 504 is a non-volatile memory unit or units. The memory 504 may also be another form of computer-readable medium, such as a magnetic or optical disk. In some implementations, the memory 504 may include expansion memory provided through an expansion interface.

The storage device 506 is capable of providing mass storage for the computing device 500. In one implementation, the storage device 506 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in such a computer-readable medium. The computer program product may also contain instructions that, when executed, perform one or more methods, such as those described above. The computer- or machine-readable medium is a storage device such as the memory 504, the storage device 506, or memory on processor 502.

The interface 508 may be a high speed controller that manages bandwidth-intensive operations for the computing device 500 or a low speed controller that manages lower bandwidth-intensive operations, or a combination of such controllers. An external interface 540 may be provided so as to enable near area communication of device 500 with other devices. In some implementations, controller 508 may be coupled to storage device 506 and expansion port 514. The expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 500 may be implemented in a number of different forms, as shown in the figure. For example, it may be implemented as a standard server 530, or multiple times in a group of such servers. It may also be implemented as part of a rack server system. In addition, it may be implemented in a personal computer such as a laptop computer 522, or smart phone 536. An entire system may be made up of multiple computing devices 500 communicating with each other. Other configurations are possible.

FIG. 6 shows an example of a generic computer device 600, which may be central index server 120 or distributed index server 140 of FIG. 1, which may be used with the techniques described here. Computing device 600 is intended to represent various example forms of large-scale data processing devices, such as servers, blade servers, datacenters, mainframes, and other large-scale computing devices. Computing device 600 may be a distributed system having multiple processors, possibly including network attached storage nodes, that are interconnected by one or more communication networks. The components shown here, their connections and relationships, and their functions, are meant to be examples only, and are not meant to limit implementations of the inventions described and/or claimed in this document.

Distributed computing system 600 may include any number of computing devices 680. Computing devices 680 may include a server or rack servers, mainframes, etc. communicating over a local or wide-area network, dedicated optical links, modems, bridges, routers, switches, wired or wireless networks, etc.

In some implementations, each computing device may include multiple racks. For example, computing device 680*a* includes multiple racks 658*a*-658*n*. Each rack may include one or more processors, such as processors 652*a*-652*n* and 662*a*-662*n*. The processors may include data processors, network attached storage devices, and other computer controlled devices. In some implementations, one processor may operate as a master processor and control the scheduling and data distribution tasks. Processors may be interconnected through one or more rack switches 658, and one or more racks may be connected through switch 678. Switch 678 may handle communications between multiple connected computing devices 600.

Each rack may include memory, such as memory 654 and memory 664, and storage, such as 656 and 666. Storage 656 and 666 may provide mass storage and may include volatile or non-volatile storage, such as network-attached disks, floppy disks, hard disks, optical disks, tapes, flash memory or other similar solid state memory devices, or an array of devices, including devices in a storage area network or other configurations. Storage 656 or 666 may be shared between multiple processors, multiple racks, or multiple computing devices and may include a computer-readable medium storing instructions executable by one or more of the processors. Memory 654 and 664 may include, e.g., volatile memory unit or units, a non-volatile memory unit or units, and/or other forms of computer-readable media, such as a magnetic or optical disks, flash memory, cache, Random Access Memory (RAM), Read Only Memory (ROM), and combinations thereof. Memory, such as memory 654 may also be shared between processors 652*a*-652*n*. Data structures, such as an index, may be stored, for example, across storage 656 and memory 654. Computing device 600 may include other components not shown, such as controllers, buses, input/output devices, communications modules, etc.

An entire system, such as system 100, may be made up of multiple computing devices 600 communicating with each other. For example, device 680*a* may communicate with devices 680*b*, 680*c*, and 680*d*, and these may collectively be known as system 100. As another example, system 100 of FIG. 1 may include one or more computing devices 600 as central index server 120 or distributed index server 140. Furthermore, some of the computing devices may be located geographically close to each other, and others may be located geographically distant. The layout of system 600 is an example only and the system may take on other layouts or configurations.

Various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any non-transitory computer program product, apparatus and/or device (e.g., magnetic discs, optical disks, memory (including Read Access Memory), Programmable Logic Devices (PLDs)) used to provide machine instructions and/or data to a programmable processor.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of implementations have been described. Nevertheless, various modifications may be made without departing from the spirit and scope of the invention. In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. A computer-implemented method for deleting non-key values from an index distributed over a plurality of computing devices, the method comprising:
    maintaining, in a memory, a non-key master list that includes the non-key values that are stored on each of the plurality of computing devices;
    receiving a list of non-key values to delete;
    intersecting, by one or more processors, the list of non-key values to delete with the non-key master list;
    creating a first delete list for a first one of the plurality of computing devices and a second delete list for a second one of the plurality of computing devices based on the intersecting, the first delete list including non-key values to be deleted that are stored on the first computing device and the second delete list including non-key values to be deleted that are stored on the second computing devices;
    transmitting the first delete list to the first computing device and the second delete list to the second computing device; and
    updating the non-key master list based on the list of non-key values to delete.

2. The method of claim 1, wherein the list of non-key values to delete includes more than one million entries.

3. The method of claim 1, wherein the index includes posting lists with entries that include a key value mapped to one or more non-key values.

4. The method of claim 3, wherein the key values are terms and the non-key values are document identifiers, such that the posting list maps terms to document identifiers of documents that contain the term.

5. The method of claim 3, wherein the first computing device removes the non-key values on the first delete list from the portion of the index stored on the first computing device.

6. The method of claim 1, wherein maintaining the non-key master list includes updating the list as part of a rolling index maintenance process.

7. The method of claim 1, wherein the non-key master list is distinct from a database index file.

8. A tangible computer-readable storage medium having recorded and embodied thereon instructions that, when executed by one or more processors of a computer system, cause the computer system to perform the method of claim 1.

9. A system comprising:
   a plurality of computing devices storing an index distributed over the plurality of computing devices; and
   a central server in communication with the plurality of computing devices, the central server storing a non-key master list that includes non-key values that are stored on each of the plurality of computing devices and configured to perform operations including:
      receiving a list of non-key values to delete,
      intersecting the list of non-key values to delete with the non-key master list,
      creating a first delete list for a first one of the plurality of computing devices and a second delete list for a second one of the plurality of computing devices based on the intersecting, the first delete list including non-key values to be deleted that are stored on the first computing device and the second delete list including non-key values to be deleted that are stored on the second computing devices,
      transmitting the first delete list to the first computing device and the second delete list to the second computing device, and
      updating the non-key master list based on the list of non-key values to delete.

10. The system of claim 9, wherein the index comprises posting lists with entries that include a key value mapped to one or more non-key values.

11. The system of claim 10, wherein the key values are terms and the non-key values are document identifiers, such that the posting list entries map terms to document identifiers of documents that contain the term.

12. The system of claim 10, wherein the first computing device removes the non-key values on the first delete list from the posting lists stored on the first computing device.

13. The system of claim 9, wherein the non-key master list is distinct from a database index file.

14. The system of claim 9, wherein the central server is further configured to initiate adding new index entries after updating the non-key master list.

15. A computer-implemented method for deleting non-key values from an inverted index in a database distributed over a plurality of computing devices, the method comprising:
   maintaining, at each of the plurality of computing devices, a list of the non-key values that are stored on the computing device in a memory of the computing device;
   receiving, by a particular one of the plurality of computing devices, a list of non-key values to delete;
   intersecting, by one or more processors of the particular computing device, the list of non-key values to delete with the list of the non-key values that are stored on the particular computing device;
   creating a delete list for the particular computing device based on the intersecting, the delete list including non-key values to be deleted that are stored on the particular computing device; and
   removing the non-key values on the delete list from the non-key values that are stored on the particular computing device.

16. The method of claim 15, further comprising:
   updating the list of the non-key values that are stored on the particular computing device.

17. The method of claim 15, wherein the list of non-key values that are stored on each of the plurality of computing devices is distinct from a database index file.

18. The method of claim 15, wherein the index is a posting list with entries including a key value mapped to one or more non-key values.

19. The method of claim 18, wherein the key values are terms and the non-key values are document identifiers, such that the posting list maps terms to document identifiers of documents that contain the term.

20. The method of claim 15, wherein the list of non-key values maintained at the particular computing device contains non-key values stored on the plurality of computing devices.

* * * * *